United States Patent [19]

Maida

[11] 4,036,555

[45] July 19, 1977

[54] ELECTROMAGNETIC TRIGGER DEVICE IN MOTOR-DRIVEN CAMERA CAPABLE OF TIME EXPOSURE

[75] Inventor: Osamu Maida, Tokyo, Japan

[73] Assignee: Nippon Kogaku K.K., Tokyo, Japan

[21] Appl. No.: 557,388

[22] Filed: Mar. 11, 1975

[30] Foreign Application Priority Data

Mar. 19, 1974 Japan .................................. 49-30548

[51] Int. Cl.² ........................................... G03B 21/38
[52] U.S. Cl. .................................... 352/169; 352/137;
354/173
[58] Field of Search ....................... 352/137, 121, 169;
354/173

[56] References Cited

U.S. PATENT DOCUMENTS

| 3,705,764 | 12/1972 | Reinsch | 352/169 |
| 3,722,989 | 3/1973 | Inoue | 352/169 |
| 3,767,298 | 10/1973 | Reinsch | 352/121 |

Primary Examiner—Russell E. Adams
Attorney, Agent, or Firm—Shapiro and Shapiro

[57] ABSTRACT

An electromagnetic trigger device in a motor-driven camera capable of selection of continuous single-frame or time exposure mode. A latching lever latches a shutter driving mechanism in a shutter closed position in which a shutter is completely closed and in a shutter open position in which the shutter is fully opened. A preventing member prevents the latching lever from latching the shutter driving mechanism in the shutter open position when the continuous or single-frame exposure mode is selected.

15 Claims, 26 Drawing Figures

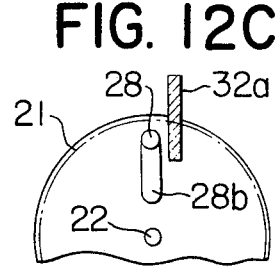
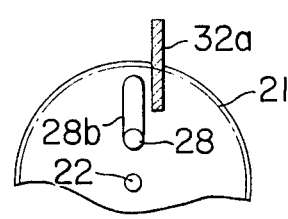
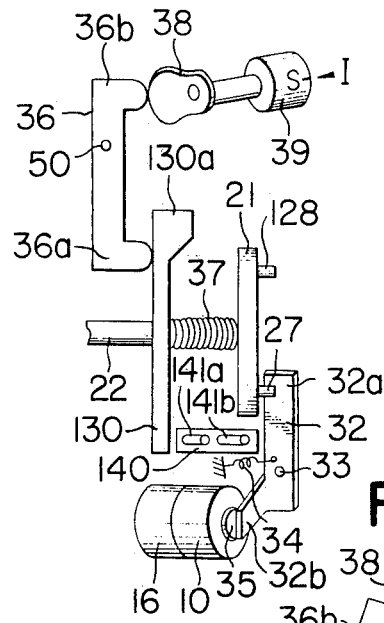
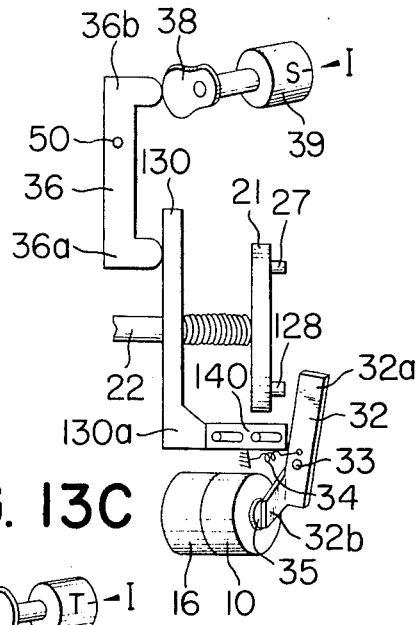
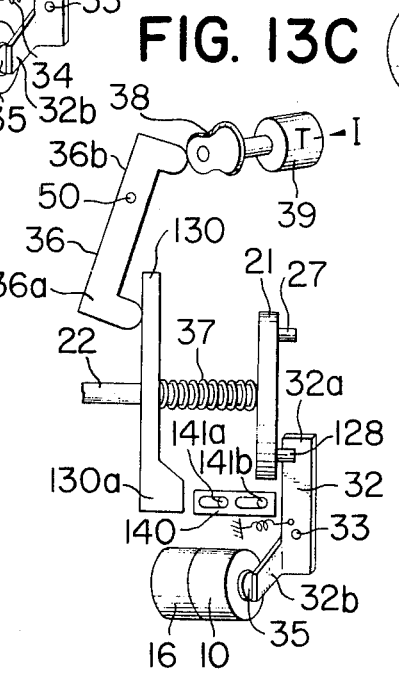

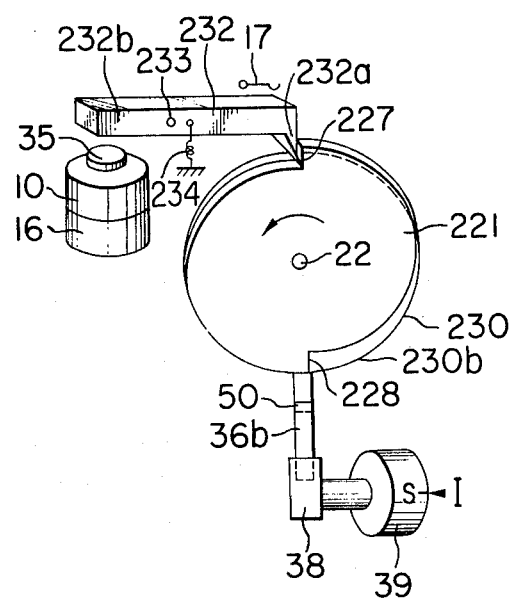
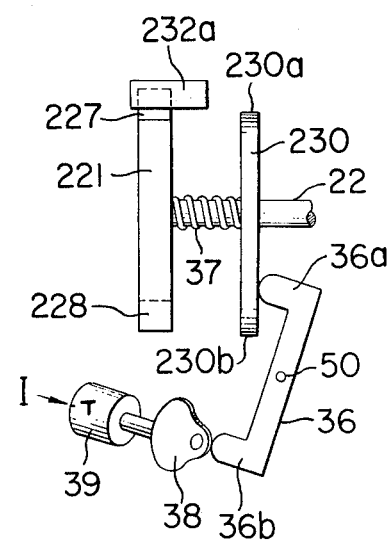
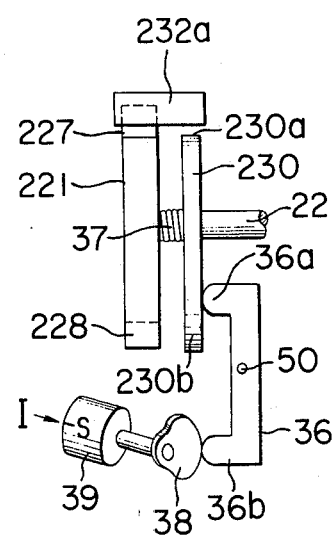
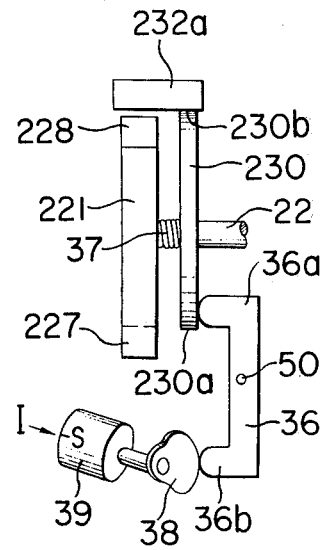

ELECTROMAGNETIC TRIGGER DEVICE IN MOTOR-DRIVEN CAMERA CAPABLE OF TIME EXPOSURE

BACKGROUND OF THE INVENTION

1. Field of the Invention

This invention relates to an electromagnetic trigger device in a camera capable of effecting time exposure.

2. Description of the Prior Art

There has been proposed a motor-driven camera such as, for example, a cine camera which is provided with a member for stopping the shutter in a position in which the shutter is fully open (to be referred to as the open shutter position hereinafter) in order to attain a long exposure time required under the low or poor lighting condition such as exposure at night or the microscopic photography, and with a member for stopping the shutter in a position in which the shutter is completely closed (to be referred to as the closed shutter position hereinafter). The motor-driven camera of type described is disclosed in U.S. Pat. No. 3,721,492. However, in such camera, when a shutter release button is depressed to terminate a long time exposure, the shutter is closed and the next frame of film is transported and successively the next exposure is initiated.

This is inconvenient for long time exposure wherein the time intervals between exposures of adjacent frames of film may be such that a 20-second exposure of a frame is followed by a 5-minute interval which in turn is followed by 20-second exposure of a subsequent frame and then by a 5-minute interval, as in the microscopic photography of cell division, crystal growth or the like. Further, this camera has the advantage that when the shutter release buttom which is already depressed may be released to terminate continuous exposure the shutter is stopped in the shutter open position depending on the timing of the release of the button because of two shutter stop members.

SUMMARY OF THE INVENTION

The present invention intends to eliminate the above-noted disadvantages and to provide a simple and convenient electromagnetic trigger device which, during continuous exposure, ensures the shutter to be stopped in its closed position independently of the timing with which the release button is released and which, during time exposure, enables opening and closing of the shutter to occur alternately upon each depression of the release button, thereby accomplishing long time exposure.

According to a preferred embodiment of the present invention, an electromagnetic trigger device in a motor-driven camera capable of effecting time exposure comprises a power source; a motor; trigger switch means; shutter driving means driven by said motor for driving a shutter and movable between a closed shutter position in which the shutter is completely closed and an open shutter position in which the shutter is fully open; latching means movable between a latching position and a non-latching position, said latching means being adapted, when moved to said latching position, to latch said shutter driving means which occupies one of the closed and open shutter positions; a motor switch for electrically connecting said motor to said power source when said latching means is in the non-latching position; starting electromagnetic means energized to attract said latching means to move it to the non-latching position for a predetermined time interval when said trigger switch means is operated, said predetermined time interval being shorter than the shorter of the time required for said shutter driving means to move from the closed shutter position to the open shutter position and the time required for said shutter driving means to move from the open shutter position to the closed shutter position; a selector member for selecting continuous exposure mode and time exposure mode; holding electromagnetic means responsive to said selector member and said trigger switch means, said holding electromagnetic means being energized to hold said latching means in the non-latching position when said selector member selects the continuous exposure mode and when said trigger switch means is being operated; preventing means responsive to said selector member, said preventing means preventing said latching means from latching said shutter driving means which occupies the open shutter position when said selector member selects the continuous exposure mode.

The invention will become more fully apparent from the following detailed description of various embodiments thereof taken in conjunction with the accompanying drawings, throughout which functionally similar members are given similar reference characters.

BRIEF DESCRIPTION OF THE DRAWINGS

FIGS. 12A – 12D show a modification of the means for shifting the open position projection in FIG. 2.

FIGS. 13A – 13C are side-views of a further embodiment of the mechanism portion of the present invention.

FIG. 14 is a front view of a further embodiment of the mechanical portion of the invention.

FIGS. 15A – 15C illustrate the operational relationship of FIG. 14.

DESCRIPTION OF THE PREFERRED EMBODIMENTS

Figure 1:
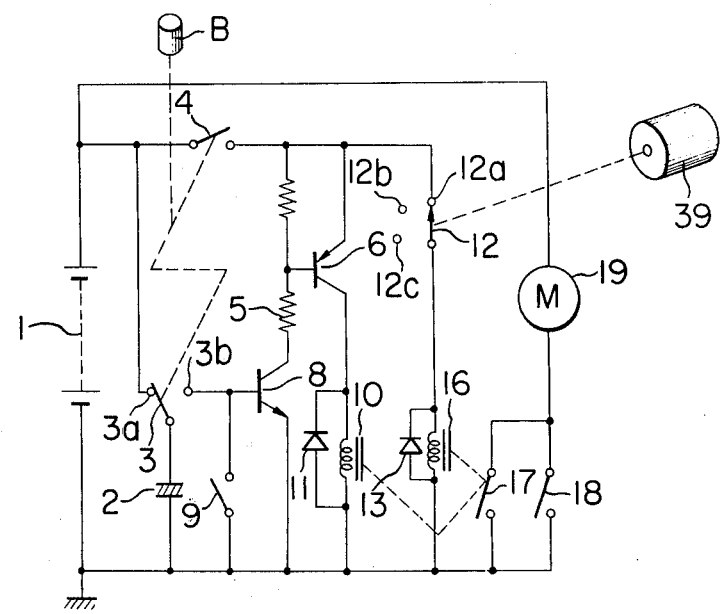
FIG. 1 is a circuit diagram showing a first embodiment of the present invention.

In FIG. 1 which shows a first embodiment of the present invention, there is a power source 1, a starting capacitor 2, and a first trigger switch 3 having change-over contacts 3a and 3b and operatively associated with a second trigger switch 4. The first and second trigger switches 3 and 4 are also operatively associated with a camera's release button B so that upon depression of the release button, i.e. during operation of the camera, the first trigger switch 3 shifts to the contact 3b while the second trigger switch 4 is closed and that upon release of the button B, i.e. during inoperative condition of the camera, the first trigger switch 3 shifts to the contact 3a while the second trigger switch 4 is opened. A resistor 5, a PNP transistor 6 and an NPN transistor 8 together constitute a switching circuit. The base of the transistor 8 is connected to the contact 3b of the first trigger switch 3 and, when the first trigger switch is changed over to the contact 3b, the discharging current of the capacitor 2 will flow to the base of the transistor 8 to trigger the transistors 8 and 6 into conductive state. A reset switch 9 is further connected between the base and the emitter of the transistor 8 and maintained open during inoperative condition of the camera.

A starting electromagnet coil 10 is connected between the collector of the transistor 6 and the negative terminal of the power source. A diode 11 is parallel-connected to the first electromagnet coil 10 in order to absorb any inverse voltage produced across the coil so as to prevent such inverse voltage from affecting other elements. An exposure mode change-over switch 12 has change-over contacts 12a, 12b and 12c and may effect mode selection, as will be described, in such a manner that selection of the contact 12a results in the mode of continuous exposure, selection of the contact 12b results in the mode of single-frame exposure, and selection of the contact 12c results in the mode of time exposure.

The contact 12a is connected to the positive terminal of the power source 1 through the second trigger switch 4, the contact 12b and the contact 12c are connected in no way. A holding electromagnet coil 16 is connected between the junction between the switch 12 and the negative terminal of the power source 1. The starting electromagnet coil 10 has its number of coil turns and its resistance value selected such that it usually passes therethrough a great current to produce a magnetic force necessary to actuate an armature 32b which will later be described, and the holding electromagnet coil 16 has its number of coil turns and its resistance value selected such that it usually passes therethrough a small current to produce a magnetic force sufficient to hold the armature 32b is attracted position. A diode 13 is parallel-connected with the magnetic coil 16 so as to absorb any inverse voltage produced across the coil in the same manner as the diode 11. A motor switch 17 is adapted, when a latching lever 32 to be described is liberated from its latching position upon energization of the electromagnet, to be closed and thereby control a DC motor 19 series-connected to the power source 1 through the motor switch 17. Preferably, a phase switch 18 may be parallel-connected to the motor switch 17 for determining the stop position of a shutter driving mechanism driven from the motor 19, as will further be described. (The negative terminal of the power source 1 is shown to be grounded to the camera body, for the purpose of illustration)

Figure 2:
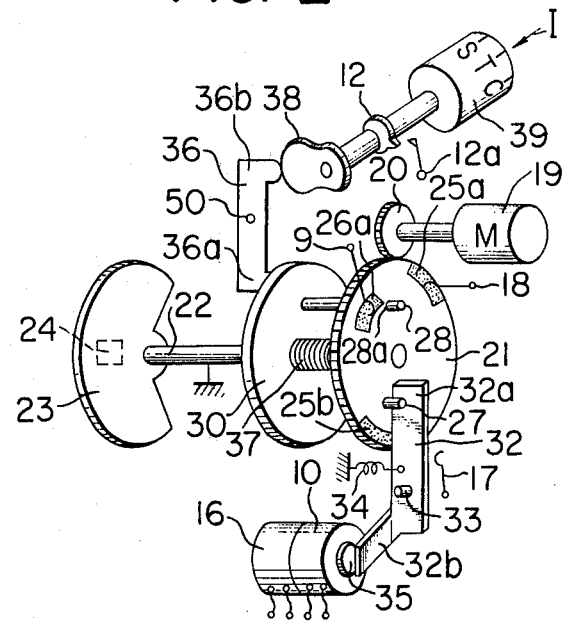
FIG. 2 is a perspective view of an embodiment of the mechanism portion according to the present invention.

FIG. 2 is a perspective view showing an embodiment of the mechanism portion to which the circuit of FIG. 1 is applied. An electrically conductive reduction gear 21 is integral with an electrically conductive, grounded, main interlocking shaft 22 and may be driven from the motor 19 through a motor gear 20. A rotary shutter 23 is provided on one end of the main interlocking shaft 22 to uncover and cover an exposure window 24 along which a film is moved. The opening and closing of the shutter takes place in synchronism with one complete rotation of the gear 21 and one-frame feed of the film is effected by unshown film transport means associated with the shaft 22 when the shutter is closed. The gears 20, 21 and the shaft 22 constitute the shutter driving mechanism for driving the shutter and transporting the film. On one side surface of the electrically conductive reduction gear 21, a contact member 9 forming the reset switch and a contact member 18 forming the phase switch are in contact with the one side surface of the gear 21 on different circumferences thereof. On that circumference of the reduction gear 21 which is contacted by the phase switch 18, there are provided insulating plates 25a and 25b which are symmetrically located about the axis of rotation. On that circumference of the reduction gear 21 which is contacted by the reset switch 9, there are provided insulating plates 26a and 26b which are symmetrically located about the axis of rotation. The electrically conductive reduction gear 21 and the insulating plates 25a, 25b, 26a and 26b thereon and the contact members 18 and 9 constitute the phase switch 18 and the reset switch 9 of FIG. 1, respectively, and the opening and closing of these switches are effected by rotation of the electrically conductive reduction gear 21. On said side surface of the reduction gear 21 there is further provided a closed position projection 27, and formed with an aperture 28a symmetrically to the projection 27 about the axis of rotation. A disc 30 is supported axially slidably to the shaft 22 and is rotatable therewith. On the disc 30 is planted a bar 28 which is engageable with the aperture 28a of the reduction gear 21. The bar, when it projects through the aperture 28a, functions as an open position projection. A lever 36 is supported rotatably about a support shaft 50, and an end 36a of the lever is in contact with the disc 30, while the other 36b being in contact with a cam 38 which is operated from external. In such a construction, the lever 36 is rocked by rotation of the cam 38 to thereby slide axially the disc 30 so that the bar 28 is projected or extended from the side surface of the gear 21 through the aperture 28a (FIG. 3A) or is withdrawn or retracted from the side surface of the gear 21 (FIG. 3B).

The disc 30 is slid along the shaft 22 by operation of an exposure mode selection knob 39 so that the bar 28 is projected from the side surface of the gear 21 to function as the open position projection when the selection knob 39 selects the time exposure mode and that the bar 28 is retracted from said side surface not to engage the latching lever 32 when the knob 39 selects the single-frame or continuous exposure mode. A spring 37 provided between the gear 21 and the disc 30 urges the disc 30 in the leftward in FIG. 2.

The exposure mode selection knob 39 is provided integrally with the change-over switch 12 and the cam 38. The knob 39 is formed with marks C, S and T which correspond to continuous, single frame and time exposure modes, respectively. The selection or change-over of the exposure mode is carried out by aligning any one of the marks with a fixed index I. When the mark T is aligned with the index I, the change-over switch 12 selects the contact 12c while the bar 28 is projected from the side surface of the gear 21. When the mark S is aligned with the index I, the change-over switch 12 selects the contact 12b and the bar 28 is withdrawn from the gear 21. When the mark C is aligned with the index I, the change-over switch 12 selects the contact 12a while the bar 28 is withdrawn.

The latching lever 32 is pivotally supported on a pin 33 and has one end forming a pawl 32a engageable with the projection 27 or 28 and the other end forming an armature 32b. The latching lever is biased counter-clockwise by an electrically conductive, grounded spring 34 so as to bring the pawl 32a into engagement with the projection 27 or 28. Since the spring 34 is grounded, the latching lever 32 is at ground potential. A core 35 is common to the starting and holding electromagnet coils 10 and 16 and cooperates with these coils to form an electromagnet, which when energized by a current flow through the coil 10, attracts the armature 32b to cause the latching lever 32 to be rotated clockwise against the force of the spring 34 and disengaged from the projection 27 or 28, to thereby permit free rotation of the gear 21 and bring about engagement between the contact member 17 forming the motor switch and the latching lever 32, thus closing the motor switch 17 to permit power supply to the motor 19.

Figure 3A:
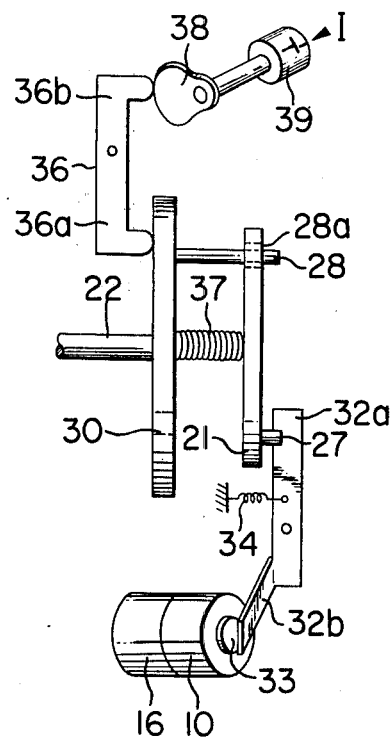
FIGS. 3A and 3B illustrate the operational relationship in FIG. 2.
Figure 3B:
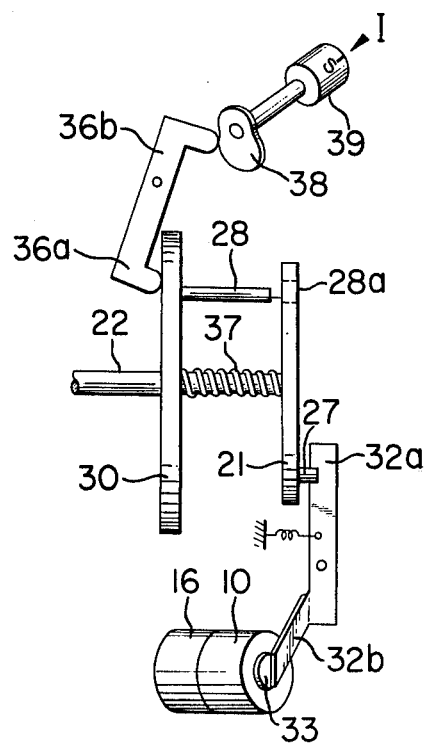

FIGS. 3A and 3B are views explaining the operational relationship between the knob 39 and the open position projection 28. FIG. 3A shows a position in which the selection knob 39 selects the time exposure mode, where the projection 28 is projected from the side surface of the gear 21 to be engageable with the pawl 32a. This state is maintained by the contact of the end 36b of the lever 36 with a cam surface having larger diameter of the cam 38. FIG. 3B shows a relation where the knob 39 selects a single frame or continuous exposure mode. In this state, the end 36b of the lever is in contact with a cam surface having smaller diameter of the cam 38 so that the lever 36 becomes rockable. Thus, the disc 30 is moved leftward by the spring 37 to retract the bar 28 from the side surface of the gear 21 to a position where the bar 28 can not engage the pawl 32a.

Figure 4A:
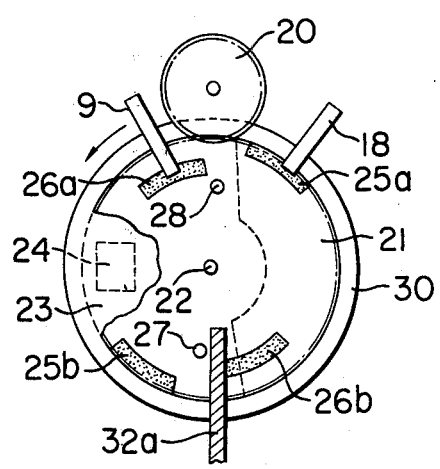
FIGS. 4A and 4B are front views illustrating the operational relationship in FIG. 2.
Figure 4B:
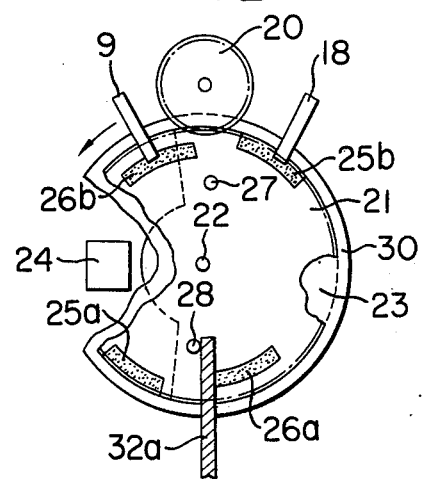

FIGS. 4A and 4B are views explaining the phase relation ships between the various switches in FIG. 2, and show the gear 21 and the disc 30 partly cut away. FIG. 4A shows a shutter closed position where the closed position projection 27 is in engagement with the pawl 32a and the shutter is completely closed. FIG. 4B shows a shutter open position where the open position projection 28 is in engagement with the pawl 32a and the shutter is fully opened. Arrow indicates the direction of rotation of the gear.

Figure 5A:
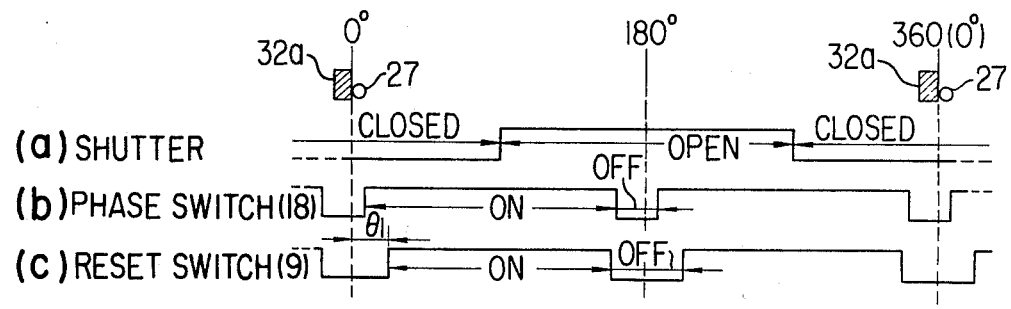
FIGS. 5A and 5B illustrate the phase relationships of various switches in FIGS. 1 and 2.
Figure 5B:
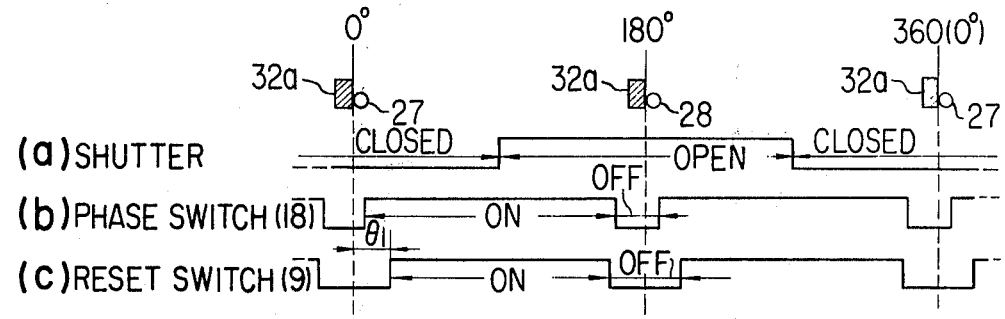

FIGS. 5A and 5B are phase illustrations showing the sequence of opening and closing of each switch and the shutter during one complete rotation of the gear 21 starting from the position where the latching pawl 32a engages the closed position projection 27, such position being the zero-angle or reference position 0°. In those Figures (a) indicates the sequence of opening and closing of the shutter, and (b) and (c) indicate the sequence of opening and closing of the phase switch 18, the reset switch 9, respectively. FIG. 5A corresponds to the continuous and single frame exposure modes, and FIG. 5B corresponds to the time exposure mode.

Operation of the present electromagnetic trigger device will now be described.

When the mark C on the mode selection knob 39 is aligned with the index I, i.e. the exposure mode changeover switch 12 selects the contact 12a, and the open position projection 28 is not projected from the side surface of the gear 21, the device operates in the manner described hereinafter. When, as shown in FIGS. 2 and 4A, the closed position projection 27 is engaged by the latching pawl 32a to stop the shutter driving mechanism in the closed shutter position, depression of the release button B closes the second trigger switch 4 operatively associated therewith and the first trigger switch 3 changed over to the contact 3b from the contact 3a connected to the power source. As a result, the charge stored in the starting capacitor 2 flows out as a base current to the transistor 8, whereby the switching circuit formed by the transistors 6 and 8 is rendered conductive. Upon conduction of the transistor 6, a current flow to the starting coil 10 which thus energizes the core 35, which in turn attracts the armature 32b to rotate the latching lever 32 clockwise against the force of the spring 34, as viewed in FIG. 2. The holding coil 16 is also energized because it is supplied with a current through the change-over switch 12.

When the armature 32b is attracted to the core 35, the latching pawl 32 is disengaged from the projection 27 to close the motor switch 17, thus energizing the motor 19 for rotation. The rotation of the motor 19 causes rotation of the gear 21. When the gear 21 is rotated through an angle $\Theta_1$, the reset switch 9 is closed as shown by (c) in FIG. 5A, and thereby the base-emitter of the transistor 8 is short-circuited to render the same transistor non-conductive. Thus, the transistor 6 is also rendered non-conductive and the capacitor 2 is short-circuited thereacross to permit discharge therefrom, so that even if the reset switch 9 is opened again, the transistors 6 and 8 are not rendered conductive but remain non-conductive. Therefore, there is no current flowing to the starting coil 10 but there is a current flowing to the holding coil 16 to maintain the core 35 continuously energized by the coil 16. Since this energization is sufficient to maintain the armature 32b in attracted condition, the armature 32b remains attracted to the core 35 and the motor 19 continues its rotation to effect continuous photography as long as the second trigger switch 4 is closed.

When the release button B is released to interrupt the continuous photography, the first trigger switch 3 is changed over to the contact 3a and the second trigger switch 4 is opened, so that the energizing current from the power source 1 to the holding coil 16 is cut off. The latching lever 32 is returned by the spring 34 to the latching or engageable position where its pawl 32a is engageable with the side surface of the gear 21 to thereby open the motor switch 17, while the motor 19 will be driven by the phase switch 18 still closed until the pawl 32a is engaged with the closed position projection 27, then the shutter driving mechanism being stopped in the state of closing the shutter.

The timing with which the release button B is released will be considered. If the button B is released before the gear 21 reached the 180° position in FIG. 5A, any current does not flow through the holding coil 16 because of opening of the trigger switch 4 and the pawl 32a is returned to the engageable position, while the motor 19 continues to rotate because of closure of the phase switch 18. When the gear 21 is rotated by 180°, the phase switch 18 becomes open for a short time to interrupt the current supply to the motor. However, the motor continuously rotates by its own inertia, so the phase switch 18 is closed again to supply the current to the motor 19. Thereafter, the phase switch 18 is made open at about 360° position of the gear 21 and then the closed position projection 27 is engaged with the pawl 32a to stop the motor 19 and the shutter driving mechanism 20, 21, 22 in the shutter closed position in which the shutter is completely closed. If the release button B is released after the gear 21 reaches the 180° position, engagement of the closed position projection 27 with the pawl 32a and opening of the phase switch 18 at the 360° position stops the shutter and the shutter driving mechanism in the shutter closed position. Thus, it will be understood that the shutter driving mechanism 20, 21, 22 is stopped in its closed position without fail whenever the release button B is released.

Single frame exposure mode will now be described. Single frame exposure may occur when the mark S of the exposure mode selection knob 39 is aligned to the index I, that is, when the change-over switch 12 selects the contact 12b and the open position projection 28 in withdrawn. When, as shown in FIGS. 2 and 4A, the closed position projection 27 and the latching pawl 32a are in engagement with each other, depression of the release button B changes over the first trigger switch 3 from the contact 3a to the contact 3b and the second trigger switch 4 is closed to render the transistors 6 and 8 conductive through the starting capacitor 2, thus permitting a flow of current to the starting coil 10, as already noted. By energization of the starting coil 10, the armature 32b is attracted to the core 35 to disengage the latching pawl 32a from the closed position projection 27, thereby closing the motor switch 17 to rotate the motor 19. At this time, no current flows through the holding coil 16. The gear 21 is rotated through the angle Θ1 by the motor 19, whereupon the reset switch 9 is closed to turn off the transistors 6 and 8. By the turn-off of the transistor 6, the flow of current to the starting coil 10 is cut off so that the pawl 32a returns to the latching position. As the phase switch 18 is closed, the motor 19 continues to rotate. The phase switch becomes open at the position of 180° to cut off the current flow to the motor, but the motor continuously rotates by its own inertia so that the phase switch 18 is opened again to supply the current to the motor. Thereafter, the phase switch 18 is opened at the position of 360°, while the closed position projection 27 is made into engagement with the pawl 32a to stop the motor and the shutter driving mechanism in the shutter closed position.

Continued depression of the release button B will cause no change with the motor maintained inoperative. Release of the trigger button followed by re-depression thereof will ensure the gear to make a complete rotation and stop the shutter driving mechanism in the closed shutter position. In this way, each depression of the trigger button causes the gear 21 to make a complete rotation to thereby effect film exposure and one-frame feed of the film, thus accomplishing single-frame exposure.

Time exposure mode will now be explained. Time exposure occurs when the mark T of the photography mode selection knob 39 is aligned to the index I, that is, when the change over switch 12 selects the contact 12c and the open position projection 28 is projected from the side surface of the gear 21. When, as shown in FIGS. 2, 4A and 5B, the latching pawl 32a is in engagement with the closed position projection 27 and the shutter driving mechanism is stopped in the shutter closed position, depression of the release button B causes the first trigger switch 3 to be changed over from the contact 3a to the contact 3b and the second trigger switch 4 is closed to render the transistors 6 and 8 conductive through the starting capacitor 2, thereby permitting a flow of current to the starting coil 10, as already noted. Since the change-over switch 12 has selected the non-connected contact 12c, there is no operation effected by the holding coil 16. The operation resulting from the energization of the starting coil 10 takes place in the same manner as previously described, so that the motor 19 is driven to rotate the gear 21 through the angle Θ1, whereupon the reset switch 9 is closed to turn off the transistors 6 and 8 to deenergize the starting coil 10. Deenergization of the starting coil 10 causes the latching lever 32 to be returned to its engageable position and the motor switch 17 is opened, but the motor 19 is driven, by closing of the parallel-connected phase switch 18, to the position in which the latching pawl 32a engages the open position bar 28, and stopped in that position by the opening of the switch 18 and by the engagement of the pawl 32a with the projection 28 (FIG. 4B). Continued depression of the release button B will cause no change and the motor and the shutter driving mechanism will remain stopped in the open shutter position as shown in FIG. 4B. Release of the button B will never cause any change and the film will remain exposed to light. The reset switch 9, as shown by (c) in FIG. 5B, is open when the pawl 32a is in engagement with the open position projection 28. Therefore, when the release button B is again depressed, the starting capacitor 2 renders the transistors 6 and 8 conductive to cause the energization of the starting coil 10 so that the engagement is broken away to permit the motor 19 to rotate the gear 21. When the gear has made a slight angular rotation, the reset switch 9 is closed and therefore, the flow of current to the starting coil 10 is cut off to permit the latching pawl 32a to restore its engageable position and the motor switch 17 is opened, but the motor 19 is driven, by the closing of the phase switch 18, to the position in which the latching pawl 32a engages the closed position projection 27, and stopped in that position. During that time, the shutter is closed whereupon the film if transported by one frame by means of the not-shown film transport mechanism. Continued depression of the release button will cause no change and the shutter driving mechanism 20, 21 and 22 will remain stopped in the closed shutter position as shown in FIG. 4A. Release of the release button will neither cause any change with the shutter remaining in the closed condition. Thus, each depression of the release button B will bring about the positions of FIGS. 4A and 4B alternately, thus accomplishing time exposure.

In case where the phase switch 18 is eliminated, the shutter driving mechanism 20, 21, 22 and the motor 19 are so designed that the shutter driving mechanism may be driven or rotated by inertia of the mechanism and the motor to the 360° position (FIG. 5) when the motor is deenergized by opening the motor switch 17 in continuous or single-frame exposure mode, and that the mechanism may be driven to the 180° or 360° position by inertia of the mechanism and the motor caused during rotation of the gear 21 through Θ1 when the motor 19 is deenergized by closure of the reset switch 9 in time exposure mode.

Figure 6:
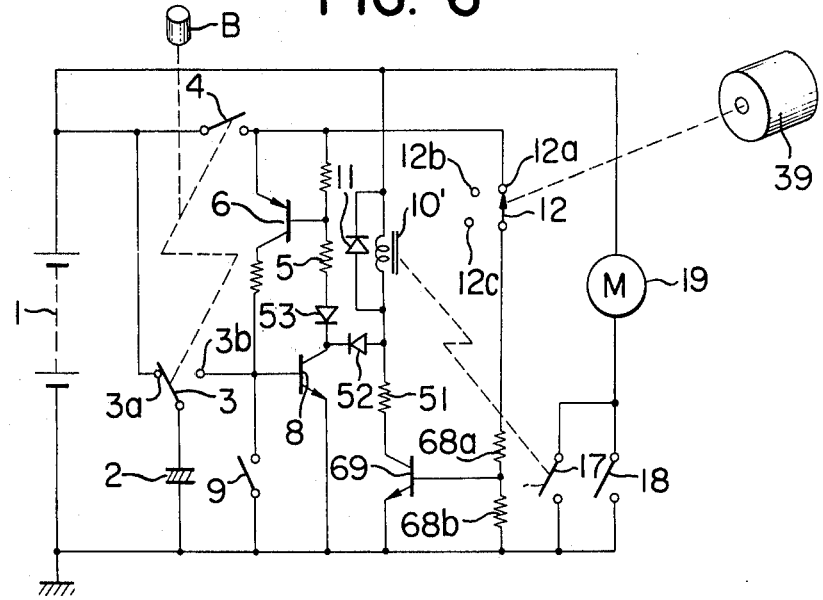
FIGS. 6 and 7 are circuit diagrams showing second and third embodiments of the present invention.

FIG. 6 shows a second embodiment of the present invention. In the embodiment of FIGS. 1 and 2, the electromagnetic coil comprises the starting coil 10 and the holding coil 16, but in the second embodiment a single coil 10' alone is used for both actuating the lever 32 and maintaining the same attracted, for the purpose of reducing the size of the electromagnet. In FIG. 6 the transistors 6 and 8 composes a positive feedback circuit as the embodiment in FIG. 1. The starting and holding coil 10' is connected to the positive terminal of the power source 1 at its one end, and to the collector of the transistor 8 at its other end through a diode 52 which prevents inverse current flow. Voltage dividing resistors 68a and 68b are connected in series each other and between the exposure mode change over switch 12 and the negative terminal of the power source 1. A switching transistor 69, of which collector is connected to the resistor 51, of which emitter to the negative terminal of the power source and of which base to the junction between the voltage dividing resistors 68a and 68b, is conductive during the current flowing through the resistors 68a and 68b. Between the collector of the transistor 8 and a resistor 5 connected to the base of the transistor 6 there is inserted a diode 53 for preventing inverse current flow.

Operation of the mode of continuous exposure will be described. In this mode, the change over switch 12 selects the contact 12a while the open position projection 28 is not projected from the side surface of the gear 21. Depression of the release button B causes the conduction of the transistors 6 and 8 by the discharge of the capacitor 2 in the similar manner to the embodiment shown in FIG. 1. By the conduction of the transistors 6 and 8 the current flows through the resistors 68a and 68b to render the transistor 69 conductive. Therefore, the starting and holding coil 10' is energized by the sum of a great current flowing through the diode 52 and the transistor 8 and a small current flowing through a resistor 51 and the transistor 69, to disengage the pawl 32a from the closed position projection 27 so that the gear 21 begins to be rotated by the motor 19. When the gear 21 is rotated by an angle Θ1, the reset switch 9 closes for the transistors 6 and 8 to be non-conductive, but the current flows through the resistors 68a and 68b so that the small holding current flows to the starting and holding coil 10' through the transistor 69. Such small holding current is of a value selected such as to enable the core 35 to maintain the armature 32b attracted thereto. The transistor 6 is never biased forwardly, because of the presence of the diode 52, to render the positive feedback circuit conductive. Thus, the holding current flows to the starting-holding coil 10' to maintain the attracted condition of the armature so as to permit continuous exposure to occur as long as the release button is depressed. Next, when a release button is released, the latching lever 32 will immediately return and engages the closed position projection 27 in the same manner as described with respect to FIG. 1.

When the change-over switch 12 selects the contact 12b and the open position projection 28 is not projected from the side surface of the gear 21, namely the mode of single-frame exposure is selected, depression of the release button B renders the transistors 6 and 8 conductive through the starting capacitor 2. Thus, there is a current flowing to the starting-holding coil 10' to disengage the latching pawl 32a from the closed position projection 27 to permit the gear 21 to be rotated by the motor 19. When the gear has rotated through the angle Θ1, the reset switch 9 renders the transistors 6 and 8 non-conductive. As the transistor 69 has been non-conductive, the latching lever 32 immediately returns, in the same manner as described, to engage the side surface of the gear 21. The phase switch 18 becomes open at the 360° position of the gear 21 and the lever 32 is in engagement with the closed position projection 27 to stop the shutter driving mechanism 20, 21 and 22 in the shutter closing position. Continuous depression of the release button does not cause any change and maintain closure of the shutter. Thus, each depression of the release button effects single-frame exposure.

When the change-over switch 12 selects the contact 12c as shown in FIG. 3A and the open position projection 28 is projected from the side surface of the gear 21, namely the mode of time exposure is selected, there is no current flowing through the dividing resistors 68a and 68b, so the transistor 69 is non-conductive as in the single-frame exposure mode. Therefore, no holding current flows and accordingly no holding action is not effected. Thus, the current flowing through the coil 10' is controlled according to energization or deenergization of the transistor 8 so that each depression of the release button causes the states shown in FIGS. 4A and 4B and effects time exposure, in the same manner as time exposure of the embodiment of FIG. 1.

Figure 7:
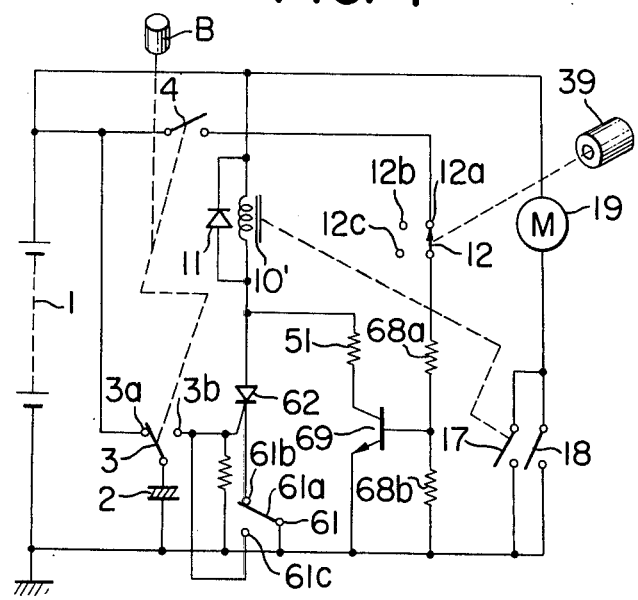

FIG. 7 shows a fourth embodiment of the present invention. In this embodiment, the electromagnet coil is the starting-holding coil 10' alone, as in the embodiment of FIG. 6, and switching of the current flowing to the coil 10' is effected an SCR. The starting-holding coil 10' has one end thereof connected to the positive terminal of the power source 1 and the other end connected to the anode of the SCR 62. The cathode of the SCR 62 is connected to the contact 61b of a reset switch 61, and the gate of the SCR is connected to the contact 3b of the trigger switch 3 and to the contact 61c of the reset switch 61. The reset switch 61 is inserted between the cathode of the SCR 62 and the negative terminal of the power source 1 to reset the SCR 62 from its conductive state to its non-conductive state, and has change-over contacts 61b and 61c so as to short-circuit the opposite ends of the starting capacitor 2 in order to permit quick discharging of the capacitor 2. The movable contact 61a of the reset switch is connected to the negative terminal of the power source. Transistor 69 effects switching of the holding current flowing to the starting-holding coil 10' through the resistor 51, as in the embodiment of FIG. 6.

Figure 8A:
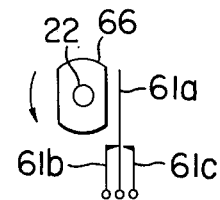
FIGS. 8A and 8B illustrate the operation of the reset switch in FIG. 7.
Figure 8B:
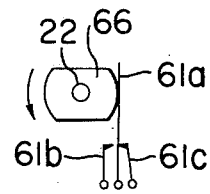

FIGS. 8A and 8B illustrate the construction and operation of the reset switch 61. Instead of the reset switch 9 of FIG. 2, a cam 66 formed of insulating material is mounted on the main interlocking shaft 22, and the springy movable contact 61a is normally engaged with the contact 61b and may be changed over into engagement with the contact 61c by the cam 66. FIG. 8A refers to a position assumed by the reset switch 61 during the rest position of FIG. 4A or 4B, and FIG. 8B refers to a position in which the reset switch 61 resets the SCR 62 during rotation of the motor 19 with the movable contact 61a brought into engagement with the contact 61c by a convex portion of the cam 66.

When the change-over switch 12 selects the contact 12a, and the open position projection does not projects from the gear 21, namely, the mode of continuous exposure, the operation will occur in the manner described below. Depression of the release button B renders the SCR 62 conductive through the starting capacitor 2 to permit an starting current to flow to the starting-holding coil 10' through SCR 62 and reset switch 61. The latching lever 32 is actuated by the starting current in the starting-holding coil 10', and the gear 21 is rotated by the motor 19. When the gear is rotated through a small angle, the reset switch 61 is changed over by the cam 66 in the manner as shown in FIG. 8B to turn off the SCR 62 and short-circuit the capacitor 2, thus permitting the capacitor to discharge its remaining charge. The SCR 62 is so turned off, but a holding current sufficient to maintain the armature 32b attracted to the core 35 flows to the starting-holding coil 10' through the current restricting resistor 51, so that the attracted condition is maintained to permit the gear 21 to be rotated for continuous exposure by the motor 19 until the release button B is released to open the second trigger switch 4. When the release button B is released, the pawl 32a never fails to engage the closed position projection 27 as previously described, and the shutter driving mechanism is stopped in the closed shutter position.

When the change-over switch 12 selects the contact 12b, and the open position projection does not project from the gear 21 namely, the mode of single-frame exposure, depression of the release button renders the SCR 62 conductive, as described, to permit an starting current to flow to the starting-holding coil 10' but the transistor 69 is non-conductive. The latching lever 32 is disengaged to permit the gear 21 to be rotated by the motor 19 and, when the gear is rotated through a small angle, the reset switch 61 is actuated by the cam 66 to turn off the SCR 62 as described, so that there is no starting current flowing to the starting-holding coil 10'.

Thus, as previously described, the latching lever 32 is returned for engagement with the closed position projection 27 and the phase switch 18 is opened at the 360° position, and the shutter driving mechanism is stopped in the shutter closing position. Thereafter, continued depression of the release button will cause no change and thus, each depression of the release button will result in single-frame exposure.

When the change-over switch 12 selects the contact 12c and the open position projection is projected from the gear 21, namely, the mode of time exposure, the transistor 69 remains non-conductive because the contact 12c is non-connected, and no holding operation occurs but as previously described, the gear 21 is rotated through 180° by the operation of the reset switch 61 upon each depression of the release button B, whereafter the gear is stopped. Thus, the conditions shown in FIGS. 4A and 4B are alternately provided to effect time exposure.

Figure 9:
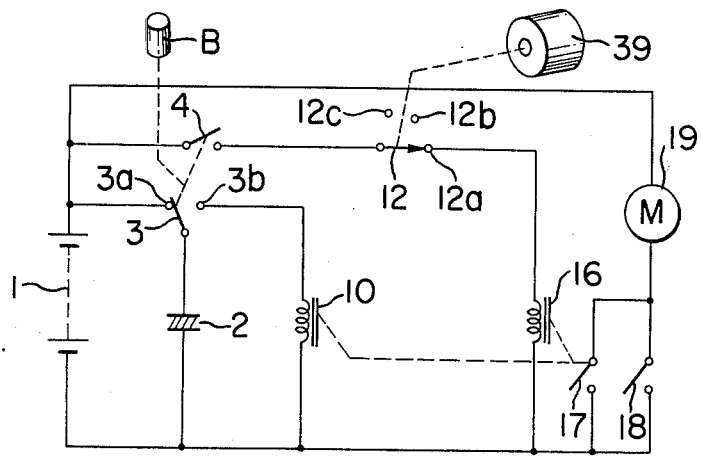
FIGS. 9, 10 and 11 are circuit diagrams showing fourth, fifth and sixth embodiments of the present invention.

FIG. 9 shows a forth embodiment of the present invention. This embodiment eliminates the positive feedback circuit (transistors 6 and 8) and reset switch 9 employed in the previous embodiments and instead, utilizes the actuating capacitor 2 alone to perform their functions. In FIG. 9, the charge stored in the capacitor 2 by the operation of the trigger switch 3 is discharged directly through the starting coil 10 so as to provide thereto a flow of current sufficient to attract the latching lever 32.

The capacity of the capacitor 2 is selected such that the time required for the discharge current to flow out is substantially equal to the time $\Theta_1$ required for the reset switch 9 or 61 in the previous embodiments to be closed.

When continuous exposure is desired, that is, the change-over switch 12 is connected to a contact 12a and the projection 28 is not projected from the side surface of the gear 21, the release button B is depressed so that the trigger switch 3 is connected to the contact 3b as previously described, and the trigger switch 4 is closed, whereupon the discharge current from the capacitor 2 flows to the actuating coil 10 to thereby disengage the latching lever 32 in the same manner as previously described, thus closing the motor switch 17 and energizing the motor 19. A holding current also flows from the power source 1 to the holding coil 16 through the switch 12, so that continuous exposure can occur as long as the release button is depressed.

If the release button B is released the shutter driving mechanism 20, 21 and 22 is stopped in the closed shutter position by engagement of the pawl 32a with the closed position projection 27 and opening of the phase switch 18 in the manner as described.

When the change-over switch 12 selects the contact 12b and the open position projection is not projected from the gear 21, namely single-frame exposure, the release button B is depressed to change over the trigger switches 3 and 4, whereby the discharge current from the capacitor 2 energizes the starting coil 10 to rotate the motor 19 while no current flows through the holding coil 16 because the switch 12 is connected to a non-connected contact 12b so that no holding action is caused.

Even after the discharge current from the capacitor 2 is exhausted and the starting coil 10 de-energized, the shutter driving mechanism 20, 21 and 22 never fails to be stopped in the closed shutter position at the 360° position after single-frame exposure has been completed.

When the change-over switch 12 selects the contact 12c and the open position projection 28 is projected from the side surface of the gear 21, namely, time exposure mode depression of the release button B energizes the starting coil 10 to rotate the motor 19, but since the switch 12 is open, no current is supplied to the holding coil 16, so that the shutter driving mechanism 20, 21 and 22 never fails to be stopped in the open shutter position upon opening of the phase switch 18 and upon engagement of the pawl 32a with the projection 28. When the release button is again depressed, the same operation as described will occur and the shutter driving mechanism will be stopped in the closed shutter position, thus completing the time exposure.

Figure 10:
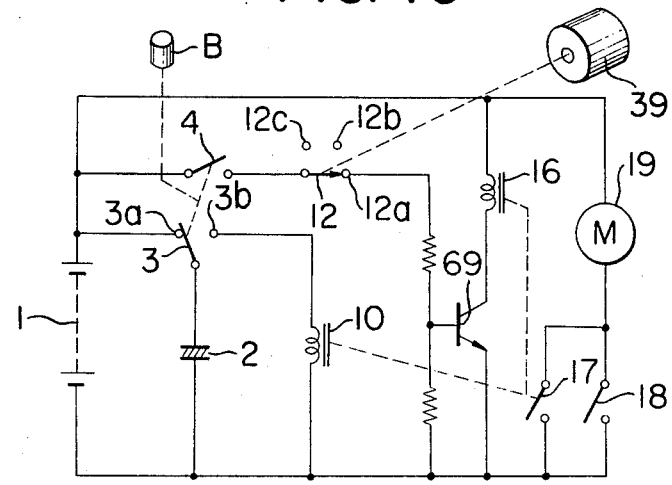

FIG. 10 shows an embodiment in which a transistor 69 is used for the switching of the holding coil 16.

Operation of this embodiment is similar to that of the FIG. 9 embodiment and need not be described.

Figure 11:
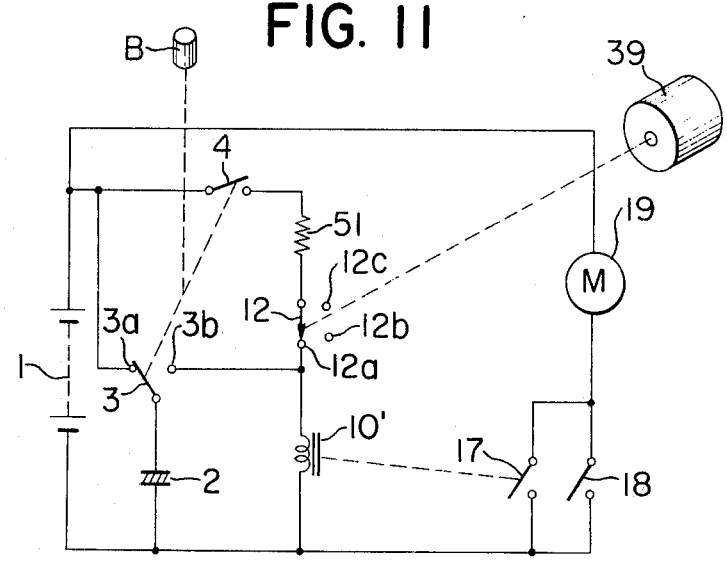

FIG. 11 shows a sixth embodiment in which the starting coil 10 and the holding coil 16 in the fifth embodiment of FIG. 9 is provided by a common coil 10'.

When the change-over switch 12 selects the contact 12a and the open position projection 28 is not projected from the side surface of the gear 21, namely, continuous exposure mode, the release button B is depressed to change over the trigger switch 3 to the contact 3b and close the trigger switch 4, whereby the discharge or starting current from the actuating capacitor 2 flows to the starting holding coil 10' so that the motor switch 17 is closed to energize the motor 19. On the other hand, as long as the trigger switch 4 is closed, holding current flows from the power source 1 to the starting-holding coil 10' through the current restricting resistor 51 and thus, exposure continues as long as the release button is depressed.

If the release button is released the starting-holding coil 10' is immediately de-energized, and consequently the phase switch 18 is opened and the projection 27 is engaged with the pawl 32a to stop the shutter driving mechanism in the closed shutter position.

When the change-over switch 12 selects the contact 12b and the projection 28 is not projected, namely, single-frame exposure, the release button is depressed, whereby discharge current as the actuating current flows from the starting capacitor 2 to the starting-holding coil 10' to rotate the motor 19. No holding current flows because the change-over switch 12 is open. As soon as the starting current from the capacitor 2 is exhausted, the coil 10' immediately de-energized. The phase switch 18 is opened at the 360° position and the projection 27 is engaged with the pawl 32a, as described, to stop the shutter driving mechanism in the closed shutter position, thus completing single-frame exposure.

When the change-over switch 12 selects the contact 12c and the open position projection 28 is projected from the side surface of the gear 21, namely, time exposure mode, depression of the release button B permits discharge current from the actuating capacitor 2 to energize the starting-holding coil 10' to rotate the motor 19. However, after such discharge current is exhausted the coil 10' is supplied with no current from anywhere because the change-over switch 12 is open and therefore, the coil is immediately de-energized, thus stopping the shutter driving mechanism 20, 21 and 22 in the open shutter position by opening of the phase switch 18 and the engagement of the pawl 32a with the projection 28.

Thereafter, when the release button is again depressed, the same operation as described just above will occur and the shutter driving mechanism will be stopped in the closed shutter position, thus accomplishing time exposure.

Figure 12A:
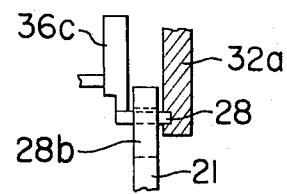
Figure 12B:
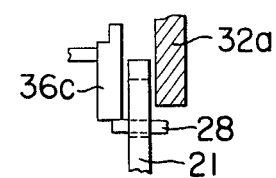

FIGS. 12A – 12D show modification of the embodiment shown in FIG. 2 which shows a mechanism for moving the open position projection 28. FIGS. 12A and 12C, each shows a state in which the pawl 32a is engageable with the open position projection 28, and FIGS. 12B and 12D, each shows a state in which both are not engageable. In those Figures, the gear 21 is formed with radially elongated slot 28b to which the open position projection 28 can be fitted. A cam 36C is moved by the mode selection knob 39 which is operated from external. In selection of the continuous or single-frame exposure mode, the cam 36C moves the open position projection 28 to a position in which the projection 28 cannot engage the pawl 32a (FIG. 12B), and in selection of the time exposure mode, the cam 36C moves the projection 28 to a position in which the projection 28 is engageable with the pawl 32a (FIG. 12A). The projection 28 follows the cam 36c by any conventional means when the projection 28 shifts from the position shown in FIG. 12A to the position shown in FIG. 12B.

FIGS. 13A to 13C shows a side view of another embodiment of the mechanism applying the FIG. 1 circuit. FIGS. 13A and 13B illustrate the operations in continuous and single frame exposure modes, respectively, while FIG. 13C shows the operation in time exposure mode.

The electrically conductive reduction gear 21 is formed integrally with the electrically conductive main shaft 22 and is driven through the motor gear 20 by the motor 19, in the same manner as the embodiment shown in FIG. 2. The phase switch 18 and the reset switch 9 are adapted to the side surface of the gear 21, as in the FIG. 2 embodiment. On the side surface of the gear 21 there is further fixed the closed position projection 27 for stopping the main shaft 22 in the shutter closed position. It is noted that an open position projection 128 is also fixed on the side surface of the gear 21. A thrust cam 130 is supported on the shaft 22 axially slidably but rotatably in unison with the gear 21. The thrust cam 130 is slided by the lever 36 along the shaft 22 so that when continuous or single frame exposure mode is selected its projection 130a is engageable with an end of a plate 140 described later, as shown in FIGS. 13A and 13B, but that when time exposure mode is selected the projection 130a is not engageable with the end of the plate 140, as shown in FIG. 13C. The projection 130a is formed on the cam 130 at the same angular position as the open position projection 128 fixed on the gear 21. Therefore, when the starting coil 10 and the holding coil 16 are de-energized, the pawl 32a is engageable with the closed position projection 27 as shown in FIG. 13A, but the pawl 32a is not engageable with the open position projection 28, as shown in FIG. 13B, by engagement of the cam projection 130a with the plate 140. The plate 140 is slidably supported by pins 141a and 141b in the right and left directions in FIGS. 13A – 13C, and is biased leftward by any means not shown. The plate 140 is so positioned and shaped that when it is moved rightward by engagement of the cam projection 130a therewith, the other end of the plate 140 is brought into contact with the latching lever 32 so that the pawl 32a may not engage the open position projection 128. A spring 37 is provided between the gear 21 and the thrust cam 130 and urges the latter leftward in FIGS. 13A – 13C. Operation will now be described.

When continuous or single-frame exposure mode is selected, the latching pawl 32a is engageable only with the closed position projection 27, but is not engageable with the open position projection 128 because of the presence of the plate 140, so the motor driving mechanism does not fail to be stopped in the shutter closing position.

When time exposure mode is selected, the projection 130a of the thrust cam 130 can not engage the plate 140 because the cam 130 is moved leftward, as shown in FIG. 13C. Therefore the motor and the shutter driving mechanism are stopped by engagement of the pawl 32a with the open position projection 128 in the open position or engagement of the pawl 32a with the closed position projection 27 in the closed position, which enables time photography.

FIGS. 14 and 15 show a further embodiment of the mechanism to which the circuit shown in FIG. 1 is applied. FIGS. 15A and 15B show the operation of continuous and single-frame exposures, and FIG. 15C shows the operation of time exposure.

The gear 21, phase switch 18, reset switch 9, motor 19 and motor gear 20, although not shown, are the same as those shown in FIG. 2.

There is further fixed a ratchet wheel 221 on the shaft 22. At the periphery of the ratchet wheel 221 is formed a closed position detent 227 for stopping rotation of the shaft 22 by engaging a latching pawl 232a in the shutter closed position, and an open position detent 228 for stopping rotation of the shaft 22 by engaging the pawl 232a in the shutter open position. A latching lever 232 functions in the similar manner as the latching lever 32 in the previous embodiments, and is supported rotatably to a pivot 233, as shown in FIG. 14. The lever 232 is formed with the pawl 232a at its one end and with armature portion 232b at its other end, and is biased clockwise by a spring 234. The operation of the lever 232 is controlled by the starting coil 10 and the holding coil 16

There is further supported on the shaft 22 a cam plate 230 slidably therealong and rotatably therewith, which has at the same angular position as the open position detent 228 a cam surface 230b having slghtly larger radius than the detent 228 of the ratchet wheel 221, for preventing the engagement of the open position detent 228 with the pawl 232a which is in the non-attracted position when continuous or single-frame photography is effected. The cam plate 230 is further formed with at the same angular position as the closed position detent 227 a cam surface 230a which has smaller radius than the distance from the shaft 22 to the detent 227, for permitting the engagement between the pawl 232a and the closed position detent 227. When the selection knob 39 selects continuous exposure C or single-frame exposure S, the cam 230 is moved leftward along the shaft 22 by the cam 38 and the lever 36 so as to be in the path of the latching pawl 232a, as shown in FIGS. 15A and 15B, so that the closed positioned detent 227 and the latching pawl 232a are made engageable with each other by the presence of the cam surface 230a, as shown in FIG. 15A, and that the open position detent 228 and the pawl 232a are made impossible to engage each other by the presence of the cam surface 230b as shown in FIG. 15B.

When time exposure is effected, the cam plate 230 is moved rightward out of the path of the latching pawl 232a so that the pawl 232a and both the closed position and open position detents 227, 228 are made engageable as shown in FIG. 15C.

Operation will now be described. When continuous or single-framed exposure is selected, the latching pawl 232a is engageable only with the closed position detent 227 because of the presence of the cam plate 230, so the shutter driving mechanism does not fail to be stopped in the shutter closing position. When time exposure is selected, the shutter driving mechanism is stopped without fail in the shutter closed position and in the shutter open position by either of the engagement of the closed position detent 227 with the pawl 232a or of the engagement of the open position detent 228 with the pawl 232a, so that time photography can be effected.

In the embodiments described above, the closed position projection or detent 27, 227 and the open position projection or detent 28, 128 are provided on the shutter driving mechanism 20, 21 and 22. However the same operation can be effected by adopting two latching levers controlled by the electromagnet, eliminating either of the closed or open projection or detent, one of the two latching levers being made impossible to engage the remaining projection or detent in the mode of continuous or single-frame exposure. This modification will be described more in detail below. For example, open position projection 28 is eliminated from the embodiment shown in FIG. 2 with only the closed position projection 27 remaining. Another latching lever other than the lever 32, which is driven by the electromagnetic means 10, 16, 35 in the same manner as the lever 32, is provided in the position symmetrical to the lever 32 with respect to the shaft 22. A further means is provided for holding the other lever so as to prevent engagement of the other lever with the projection 27 not-with-standing deenergization of the electromagnetic means in accordance with operation of the selection knob 39 when continuous or single-frame exposure is selected.

According to the modification, when time exposure is selected the shutter driving mechanism is stopped in the shutter open position by the engagement of the remaining projection 27 with another latching lever and stopped in the shutter closed position by engagement of the remaining projection 27 with the lathcing lever 32. When continuous or single-frame exposure is selected, only the latching lever 32 is engageable with the projection 27, but the other latching lever is not engageable with the projection 27 by means of the further means.

According to the present invention, as will be appreciated from the foregoing description, it is ensured that, during normal photography, the shutter driving mechanism be stopped in the closed shutter position to prevent unnecesssary exposure of the film whenever the release button is released and that, during time photography, each depression of the release button results in alternate opening and closing of the shutter to enable exposure time and the time interval between exposures to be provided as desired.

I claim:
1. An electromagnetic trigger device in a motor-driven camera comprising:
    1. a power source;
    2. a motor;
    3. trigger switch means;
    4. shutter driving means driven by said motor for driving a shutter and movable between a closed shutter position in which the shutter is completely closed and an open shutter position in which the shutter is fully open;
    5. latching means movable between a latching position and a non-latching position, said latching means being adapted, when moved to said latching position, to latch said shutter driving means which occupies one of the closed and open shutter positions;
    6. a motor switch for electrically connecting said motor to said power source when said latching means is in the non-latching position;
    7. starting electromagnetic means energized to attract said latching means to move it to the non-latching position for a predetermined time interval when said trigger switch means is operated, sid predetermined time interval being shorter than the shorter of the time required for said shutter driving means to move from the closed shutter position to the open shutter position and the time required for said shutter driving means to move from the open shutter position to the closed shutter position;
    8. a selector member for selecting continuous exposure mode and time exposure mode;
    9. holding electromagnetic means responsive to said selector member and said triger switch means, said holding electromagnetic means being energized to hold said latching means in the non-latching position when said selector member selects the continuous exposure mode and when said trigger switch means is being operated; and
    10. preventing means responsive to said selector member, said preventing means preventing said latching means from latching said shuttr driving means which occupies the open shutter position when said selector member selects the continuous exposure mode,
    said latching means including rotary means rotating in unison with said shutter driving means and movable means attracted by said starting electromagnetic means to be moved from the latching position to the non-latching position,
    said movable means being, when it is in the latching position, engaged with said rotary means to latch said shutter driving means occupying one of the closed shutter position and the open shutter position,
    said movable means being a single latching lever and said rotary means including first and second members,
    said single latching lever being engaged with said first member to latch said shutter driving means in the closed shutter position and with said second member to latch said shutter driving means in the open shutter position, said preventing means preventing engagement of said latching lever and said second member, said shutter driving means including a rotary disk, each of said first and second members comprising a projection extended from a side surface of said disk, said second member being displaceable with respect to said disk, and said preventing means including means for displacing the second member to a position in which said latching lever occupying the latching position is not engaged with said second member when said selector member selects the continuous exposure mode.

2. An electromagnetic trigger device according to claim 1, wherein said preventing means includes means for displacing said second member so as to retract it from the side surface of said disk.

3. An electromagnetic trigger device, according to claim 1, wherein said preventing means includes means for displacing said second member toward the center of rotation of said disk.

4. An electromagnetic trigger device according to claim 1, wherein said first and second members are symmetrically positioned with respect to the center of the rotation of said disk.

5. An electromagnetic trigger device in a motor-driven camera comprising:
 1. a power source;
 2. a motor;
 3. trigger switch means;
 4. shutter driving means driven by said motor for driving a shutter and movable between a closed shutter position in which the shutter is completely closed and an open shutter position in which the shutter is fully open;
 5. latching means movable between a latching position and a non-latching position, said latching means being adapted, when moved to said latching position, to latch said shutter driving means which occupies one of the closed and open shutter positions;
 6. a motor switch for electrically connecting said motor to said power source when said latching means is in the non-latching position;
 7. starting electromagnetic means energized to attract said latching means to move it to the non-latching position for a predetermined time interval when said trigger switch means is operated, said predetermined time interval being shorter than the shorter of the time required for said shutter driving means to move from the closed shutter position to the open shutter position and the time required for said shutter driving means to move from the open shutter position to the closed shutter position;
 8. a selector member for selecting continuous exposure mode and time exposure mode;
 9. holding electromagnetic means responsive to said selector member and said trigger switch means, said holding electromagnetic means being energized to hold said latching means in the non-latching position when said selector member selects the continuous exposure mode and when said trigger switch means is being operated; and
 10. preventing means responsive to said selector member, said preventing means preventing said latching means from latching said shutter driving means which occupies the open shutter position when said selector member selects the continuous exposure mode, said latching means including rotary means rotating in unison with said shutter driving means and movable means attracted by said starting electromagnetic means to be moved from the latching position to the non-latching position, said movable means being, when it is in the latching position, engaged with said rotary means to latch said shutter driving means occupying one of the closed shutter position and the open shutter position, said movable means being a single latching lever and said rotary means including first and second members, said single lever being engaged with said first member to latch said shutter driving means in the closed shutter position and with said second member to latch said shutter driving means in the open shutter position, said preventing means preventing engagement of said latching lever and said second member, said shutter driving means including a rotary disk, each of said first and second members comprising a detent formed on the periphery of said disk, and said preventing means including a rotary member rotated in unison with said disk.

6. An electromagnetic trigger device according to claim 5, wherein said shutter driving means includes a shaft on which said rotary disk is mounted, and on which said rotary member of said preventing means is axially slidably mounted, said preventing means further including means coupling said rotary to said selector member for sliding said rotary member to a position in which said rotary member is engageable with said latching lever occupying the latching position when said selector member selects the continuous exposure mode and to a position in which said rotary member is not engageable with said latching lever occupying the latching position when said selector member selects the time exposure mode, the distance between the peripheral portion of said rotary member which is opposed to said first member of said latching means and said shaft being smaller than that between said first member and said shaft, and the distance between the peripheral portion of said rotary member which is opposed to said second member of said latching means and said shaft being greater than that between said second member and said shaft.

7. An electromagnetic trigger device according to claim 1, further comprising
a starting capacitor; and
means responsive to said trigger switch means for connecting said capacitor to said starting electromagnetic means to energize it when said trigger switch means is operated.

8. An electromagnetic trigger device according to claim 7, wherein said starting electromagnetic means includes a switching circuit and a starting coil connected to said power source through said switching circuit, said switching circuit having means for rendering it conductive when said starting electromagnetic means is connected to said starting capacitor.

9. An electromagnetic trigger device according to claim 8, wherein said starting electromagnetic means includes a reset switch interlocked with said shutter driving means to render said switching circuit non-conductive.

10. An electromagnetic trigger device according to claim 9, wherein said switching circuit is a bistable circuit.

11. An electromagnetic trigger device according to claim 7, wherein said trigger switch means includes a change-over switch which connects said starting capacitor selectively to said power source and to said starting electromagnetic means, and said starting electromagnetic means includes a starting coil connected in parallel with said starting capacitor through said change-over switch.

12. An electromagnetic trigger device according to claim 5, further comprising a phase switch parallel connected to said motor switch.

said phase switch being operatively interlocked with said shutter driving means to be opened when said driving means is in the shutter closed and open positions.

13. An electromagnetic trigger device in a motor-driven camera comprising:
 1. a power source;
 2. a motor;
 3. trigger switch means;
 4. shutter driving means driven by said motor for driving a shutter and movable between a closed shutter position in which the shutter is completely closed and an open shutter position in which the shutter is fully open;
 5. latching means movable between a latching position and a non-latching position, said latching means being adapted, when moved to said latching position, to latch said shutter driving means which occupies one of the closed and open shutter positions;
 6. ) a motor switch for electrically connecting said motor to said power source when said latching means is in the non-latching position;
 7. starting electromagnetic means energized to attract said latching means to move it to the non-latching position for a predetermined time interval when said trigger switch means is operated, said predetermined time interval being shorter than the shorter of the time required for said shutter driving means to move from the closed shutter position to the open shutter position and the time required for said shutter driving means to move from the open shutter position to the closed shutter position;
 8. a selector member for selecting continuous exposure mode and time exposure mode;
 9. holding electromagnetic means responsive to said selector member and said trigger switch means, said holding electromagnetic means being energized to hold said latching means in the non-latching position when said selector member selects the continuous exposure mode and when said trigger switch means is being operated; and
 10. preventing means responsive to said selector member, and preventing means said latching means from latching said shutter driving means which occupies the open shutter position when said selector member selects the continuous exposure mode, said latching means including rotary means rotating in unison with said shutter driving means and movable means attracted by said starting electromagnetic means to be moved from the latching position to the non-latching position, said movable means being, when it is in the latching position, engaged with said rotary means to latch said shutter driving means occupying one of the closed shutter positions and the open shutter position, said movable being a single latching lever and said rotary means including first and second members, said single latching lever being engaged with said first member to latch said shutter driving means in the closed shutter position and with said second member to latch said shutter driving means in the open shutter position, said preventing means preventing engagement of said latching lever and said second member, said preventing means including a movable member which is rotated in synchronism with said shutter driving means and means for interlocking said movable member with said selector member so that said movable member is moved by said selector member to a position in which said movable member is engageable with said latching lever when said selector member selects the continuous exposure mode and to a position in which said movable member is not engageable with said latching lever when said selector member selects the time exposure mode, said movable member being engaged with said latching lever to prevent movement of said latching lever from the non-latching position to the latching position when said shutter driving means reaches the shutter open position in the continuous exposure mode.

14. An electromagnetic trigger device aaccording to claim 13, wherein said shutter driving means includes a shaft and a rotary disk mounted on said shaft, said first and second members of said latching means are provided on said rotary disk and are symmetrically positioned with respect to the rotational axis of said rotary disk, and said movable member is axially slidably mounted on said shaft and has a cam portion which is opposed to said second member of said latching means and which serves to prevent said movement of said latching lever.

15. An electromagnetic trigger device in a motor-driven camera comprising:
 1. a power source;
 2. a motor;
 3. trigger switch means;
 4. shutter driving means driven by said motor for driving a shutter and movable between a closed shutter position in which the shutter is completely closed and an open shutter position in which the shutter is fully open;
 5. latching means movable between a latching position and a non-latching position, said latching means being adapted, when moved to said latching position, to latch said shutter driving means which occupies one of the closed and open shutter positions;
 6. a motor switch for electrically connecting said motor to said power source when said latching means is in the non-latching position;

7. starting electromagnetic means energized to attract said latching means to move it to the non-latching position for a predetermined time interval when said trigger switch means is operated, said predetermined time interval being shorter than the time required for said shutter driving means to move from the closed shutter position to the open shutter position and the time required for said shutter driving means to move from the open shutter position to the closed shutter position;

8. a selector member for selecting continuous exposure mode and time exposure mode;

9. holding electromagnetic means responsive to said selector member and said trigger switch means, said holding electromagnetic means being energized to hold said latching means in the non-latching position when said selector member selects the continuous exposure mode and when said trigger switch means is being operated; and 10. preventing means responsive to said selector member said preventing means preventing said latching means from latching said shutter driving means which occupies the open shutter position when said selector member selects the continuous exposure mode, said latching means including rotary means rotating in unison with said shutter driving means and movable means attracted by said starting electromagnetic means to be moved from the latching position to the non-latching position, said movable means being, when it is in the latching position, engaged with said rotary means to latch said shutter driving means occupying one of the closed shutter position and the open shutter position, said movable means being a single latching lever and said rotary means including first and second members, said single latching lever being engaged with said first member to latch said shutter driving means in the closed shutter position and with said second member to latch said shutter driving means in the open shutter position, said preventing means preventing engagement of said latching lever and said second member, said selector member having means associated therewith for displacing said preventing means when said selector member selects the continuous exposure mode and thereby preventing engagement of said latching lever and said second member.

* * * * *